US012157131B2

(12) United States Patent
Carr et al.

(10) Patent No.: US 12,157,131 B2
(45) Date of Patent: Dec. 3, 2024

(54) LIQUID DISPENSING APPARATUS

(71) Applicant: JOHNSON & JOHNSON CONSUMER INC., Skillman, NJ (US)

(72) Inventors: William Henry Carr, Phillipsburg, NJ (US); Kelly Gail Duncan, Bethlehem, PA (US); Matthew Lawrence Norris, Easton, PA (US)

(73) Assignee: Johnson & Johnson Consumer Inc., Skillman, NJ (US)

( * ) Notice: Subject to any disclaimer, the term of this patent is extended or adjusted under 35 U.S.C. 154(b) by 0 days.

(21) Appl. No.: 17/936,942

(22) Filed: Sep. 30, 2022

(65) Prior Publication Data

US 2024/0109089 A1 Apr. 4, 2024

(51) Int. Cl.
*B05B 11/00* (2023.01)
*B05B 11/10* (2023.01)

(52) U.S. Cl.
CPC ........ *B05B 11/1077* (2023.01); *B05B 11/105* (2023.01); *B05B 11/1059* (2023.01); *B05B 11/1074* (2023.01)

(58) Field of Classification Search
CPC ............... B05B 11/1077; B05B 11/105; B05B 11/1059; B05B 11/1074
See application file for complete search history.

(56) References Cited

U.S. PATENT DOCUMENTS

| | | | | | |
|---|---|---|---|---|---|
| 2,833,448 | A * | 5/1958 | Lerner | B05B 11/062 | 215/329 |
| 6,223,954 | B1 * | 5/2001 | Carow | G01F 11/028 | 222/340 |
| 6,478,197 | B2 * | 11/2002 | Bethune | B05B 11/1074 | 222/340 |
| 9,539,597 | B2 * | 1/2017 | Ding | B05B 11/0027 | |
| 10,335,816 | B1 * | 7/2019 | Arminak | B05B 11/1023 | |
| 11,203,026 | B2 * | 12/2021 | Ding | B05B 11/1074 | |
| 11,471,905 | B1 * | 10/2022 | Arminak | B05B 11/1077 | |
| 2002/0190079 | A1 * | 12/2002 | Hamamoto | B65D 1/0215 | 222/481.5 |
| 2003/0057297 | A1 * | 3/2003 | Py | B05B 11/0072 | 239/491 |
| 2004/0149777 | A1 * | 8/2004 | Santagiuliana | B05B 11/1023 | 222/190 |

(Continued)

FOREIGN PATENT DOCUMENTS

| | | | | |
|---|---|---|---|---|
| CA | 2342122 A1 * | 9/2001 | B05B 11/3042 |
| CN | 112340222 * | 2/2021 | |

(Continued)

*Primary Examiner* — Bob Zadeh

(57) ABSTRACT

A container closure can include a collar, an actuator, and a biasing element. The collar can be configured to couple to a container. The collar can have a container facing surface and a second surface opposite the container facing surface. The actuator can be movable relative to the collar from a first position to a second position. The actuator can be in fluid communication with a cavity defined by the container such that the actuator dispenses material out of the container as the actuator moves from the first position to the second position. The biasing element can have a first portion coupled to the actuator and a second portion coupled to the second surface of the collar, the biasing element configured to bias the actuator toward the first position.

15 Claims, 14 Drawing Sheets

(56) References Cited

U.S. PATENT DOCUMENTS

| | | | | |
|---|---|---|---|---|
| 2005/0082311 | A1* | 4/2005 | Good | B05B 11/1057 222/1 |
| 2008/0260451 | A1 | 10/2008 | Caron | |
| 2010/0230443 | A1 | 9/2010 | Ding | |
| 2020/0306779 | A1* | 10/2020 | Ding | B65D 47/00 |
| 2021/0000306 | A1* | 1/2021 | Arminak | B05B 11/0044 |
| 2022/0379330 | A1* | 12/2022 | Ding | B05B 11/1052 |

FOREIGN PATENT DOCUMENTS

| | | | | | |
|---|---|---|---|---|---|
| EP | 1286783 | B1 | * | 4/2004 | B05B 11/0044 |
| EP | 3175927 | A1 | * | 6/2017 | B05B 11/3001 |
| JP | 2004202398 | A | * | 7/2004 | |
| WO | WO-02083318 | A2 | * | 10/2002 | B05B 11/3023 |
| WO | WO-2006013419 | A1 | * | 2/2006 | B05B 11/3008 |
| WO | WO-2021206252 | A1 | * | 10/2021 | B05B 11/1023 |

* cited by examiner

LIQUID DISPENSING APPARATUS

TECHNICAL FIELD

The present disclosure relates generally to a container closure, and more specifically to a pump that discharges material from a container.

BACKGROUND

Hand-operated dispensing pumps are well-known for dispensing fluid products such as liquids, including body-wash, lotions and other skin and hair care products. Most commercial pumps for dispensing liquids are made from various materials, including, for example, a metal compression ring to drive regeneration of the pump actuator back to its starting position after being depressed. Traditional hand-operated dispensing pumps are typically pre-installed on a fluid filled container prior to sale and are disposed of with the container after use. However, the springs in such pumps can be subject to wear and are difficult to recycle, which is undesirable or unacceptable to many of today's environmentally conscious consumers.

Thus, there is a need in the art for a hand-operated, liquid dispensing pump that is made from recyclable material and that has parity with the effectiveness of those traditional pumps that use a metal compression ring.

SUMMARY

A container closure can include a collar, an actuator, and a biasing element. The collar can be configured to couple to a container. The collar can have a container facing surface and a second surface opposite the container facing surface. The actuator can be movable relative to the collar from a first position to a second position. The actuator can be in fluid communication with a cavity defined by the container such that the actuator dispenses material out of the container as the actuator moves from the first position to the second position. The biasing element can have a first portion coupled to the actuator and a second portion coupled to the second surface of the collar. The biasing element can be configured to bias the actuator toward the first position.

The first portion can be proximal to a proximal surface of the collar and the second portion can be distal to the proximal surface of the collar when the actuator is in the first position. The second portion can be proximal to a distal end of the collar when the actuator is in the second position. The collar and the biasing element can be a monolithic construct. The biasing element can include a first end and a second end opposite the first end along a biasing element central axis, the biasing element central axis can define a first path when the actuator can be in the first position. The biasing element central axis can define a second path different from the first path when the actuator can be in the second position. The actuator can be proximal to a proximal most surface of the biasing element in the first position. The actuator can be distal to the proximal most surface of the biasing element in the second position. The biasing element can be external to the container. The actuator can be configured to move along an actuator axis between the first position and the second position. The collar can include a lateral surface spaced from the actuator axis by a first distance along a lateral axis. The biasing element can include a biasing element lateral surface spaced from the actuator axis by a second distance along the lateral axis. The second distance can be greater than the first distance.

In a further embodiment, the container closure can include an applicator coupled to the biasing element the applicator configured to engage an outer surface of the actuator. The actuator can be moveable from a locked position to an unlocked position, wherein a retaining element of the actuator can be engaged with a retainer of the biasing element in the locked position and the retaining element can be disengaged from the retainer in the unlocked position. The actuator can be rotatable between the locked position and the unlocked position. The actuator can be axially translatable from the first position to the second position when the actuator can be in the unlocked position. The biasing element can be a first biasing element and the container closure further can include a second biasing element having a first portion coupled to the actuator and a second portion coupled to the second surface of the collar. The first biasing element and the second biasing element can be spaced from each other by at least 25 degrees. A vessel can be coupled to the collar, the vessel configured to receive material from the container.

In a further embodiment, the container closure can include a conduit having a first conduit end coupled to the actuator and a second conduit end within the vessel, the conduit defining a pathway such that material moves from the vessel through the conduit and out the actuator. The container closure can include a seal forming a liquid barrier between the conduit and the vessel. At least a portion of the vessel can be disposed inside the cavity of the container and the biasing element can be disposed outside the cavity of the container. The seal can be movable relative to the conduit from a sealed position where the seal prevents material from entering or exiting the conduit to a released position where material can enter or exit the vessel through the conduit. The vessel may not include an energy source. The container closure can be made from a recyclable material.

BRIEF DESCRIPTION OF THE DRAWINGS

The present application is further understood when read in conjunction with the appended drawings. For the purpose of illustrating the subject matter, there are shown in the drawings exemplary aspects of the subject matter; however, the presently disclosed subject matter is not limited to the specific methods, devices, and systems disclosed. In the drawings.

Aspects of the disclosure will now be described in detail with reference to the drawings, wherein like reference numbers refer to like elements throughout, unless specified otherwise.

DETAILED DESCRIPTION OF ILLUSTRATIVE EMBODIMENTS

Disclosed herein are embodiments of a dispensing apparatus. The dispensing apparatus may be fully recyclable. Full recyclability may be achieved by having all components of the dispensing apparatus molded out of recyclable material. The recyclable material can be plastic. At least some components of the dispensing apparatus can be manufactured from the same material. A fully recyclable dispensing apparatus can still yield the same effectiveness in dispensing fluid products.

Figure 1:
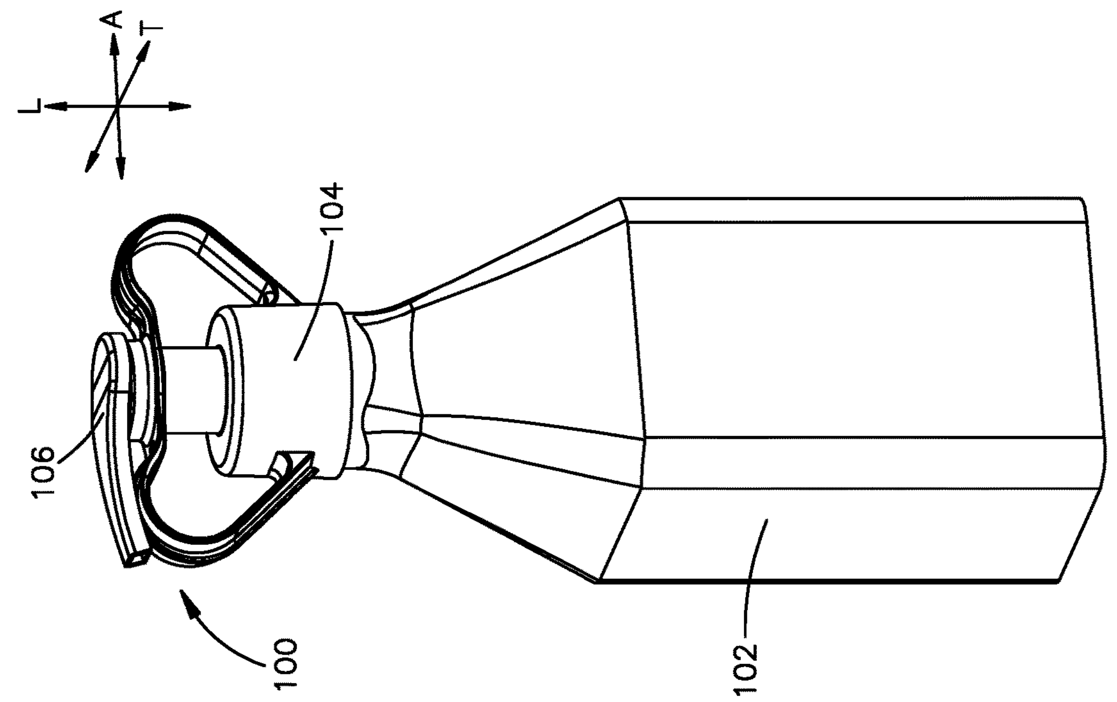
FIG. 1 is a perspective view of a container and a closure in accordance with one embodiment of the present disclosure.
Figure 2:
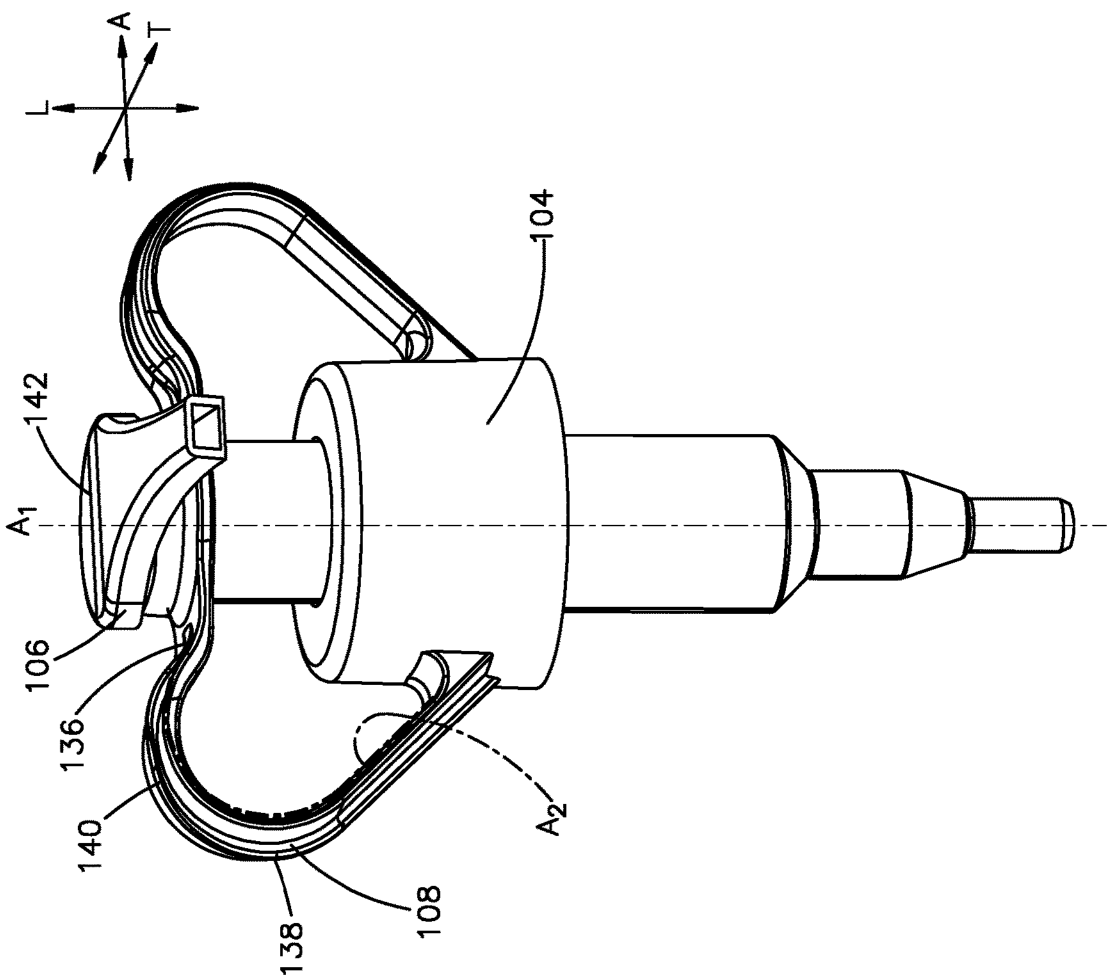
FIG. 2 is a perspective view of the closure of FIG. 1 in an initial configuration.
Figure 3:
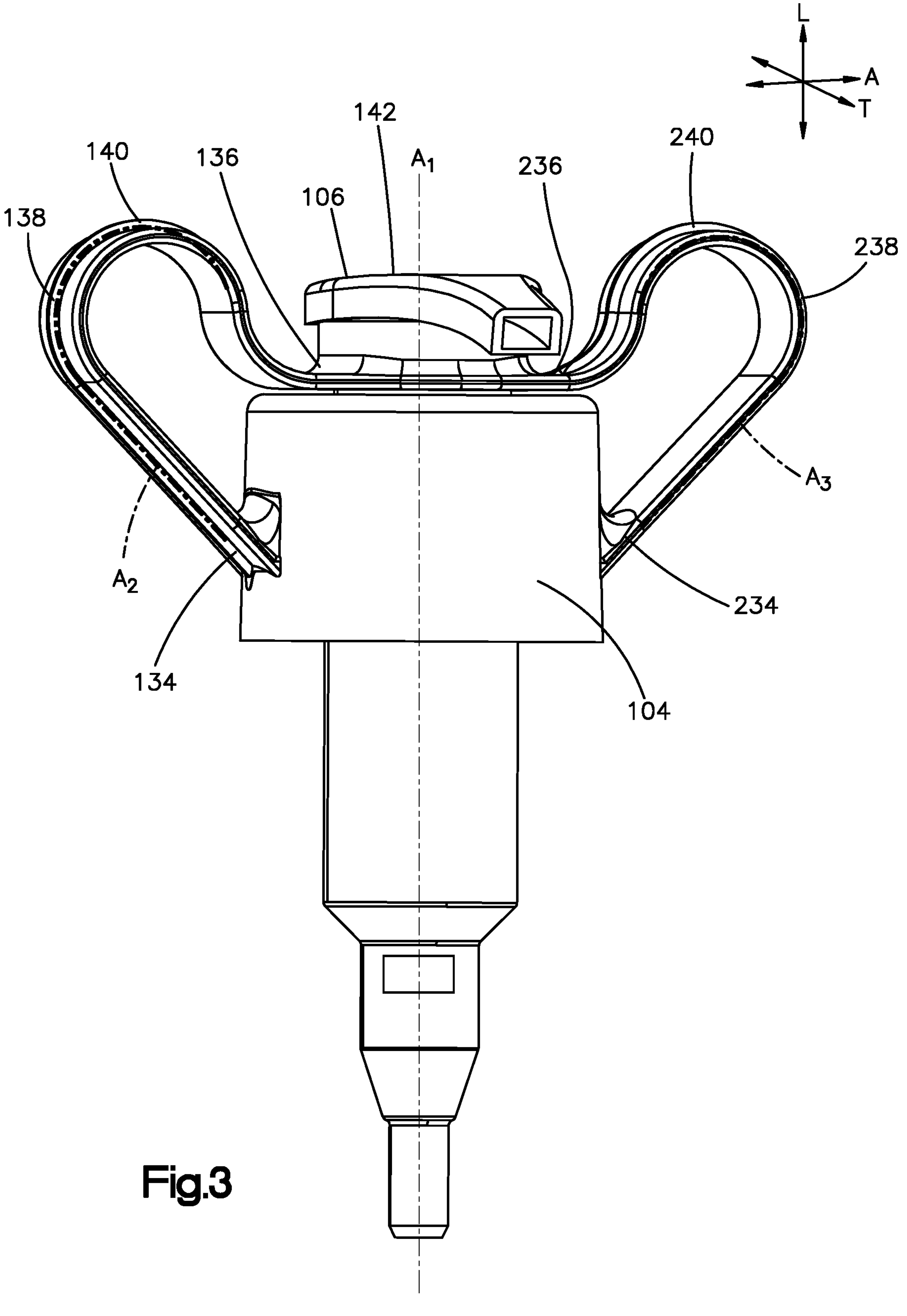
FIG. 3 is a perspective view of the closure of FIG. 1 in a dispensing configuration.

An embodiment of a dispensing apparatus is shown in FIG. 1. The dispensing apparatus can include a closure 100 that can be coupled to a container 102. The closure 100 can be configured to dispense material out of the container 102. The closure 100 can include an actuator 106 configured to eject fluid from the container 102. In some examples, the actuator 106 is a nozzle. In other examples, the actuator 106 is a pump or siphon. The actuator 106 can be configured to eject fluid from a cavity 103 (FIG. 5) defined by the container. The actuator can be coupled to a collar 104 that is couplable to the container 102. The actuator 106 can extend from the collar 104. The actuator 106 can be movably coupled to the collar 104. The actuator 106 can be moveable along a central axis $A_1$ relative to the collar 104. The actuator 106 can be moveable in a first direction relative to the collar 104 from a first position (FIG. 2) to a second position (FIG. 3). The actuator 106 can dispense material out of the container as the actuator 106 moves from the first position to the second position. The first position can be an initial position. The second position can be a dispensing position. The actuator 106 can be moveable in a second direction relative to the collar 104 from the second position to the first position. The second direction can be opposite to the first direction. A biasing element 108 can be coupled to the collar 104 and the actuator 106. The biasing element 108 can urge the actuator 106 toward the first position.

Figure 4:
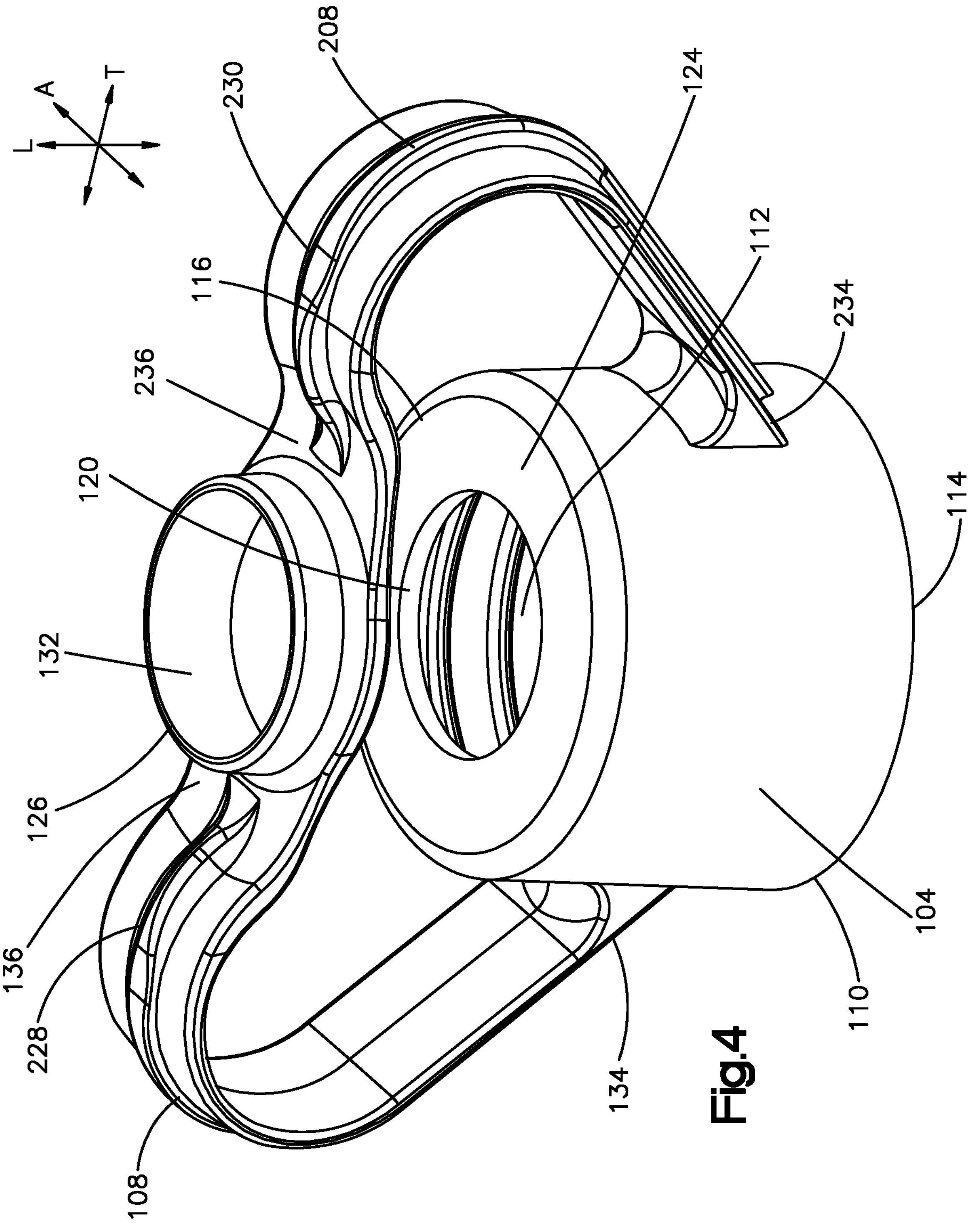
FIG. 4 is a perspective view of the collar of FIG. 1.
Figure 5:
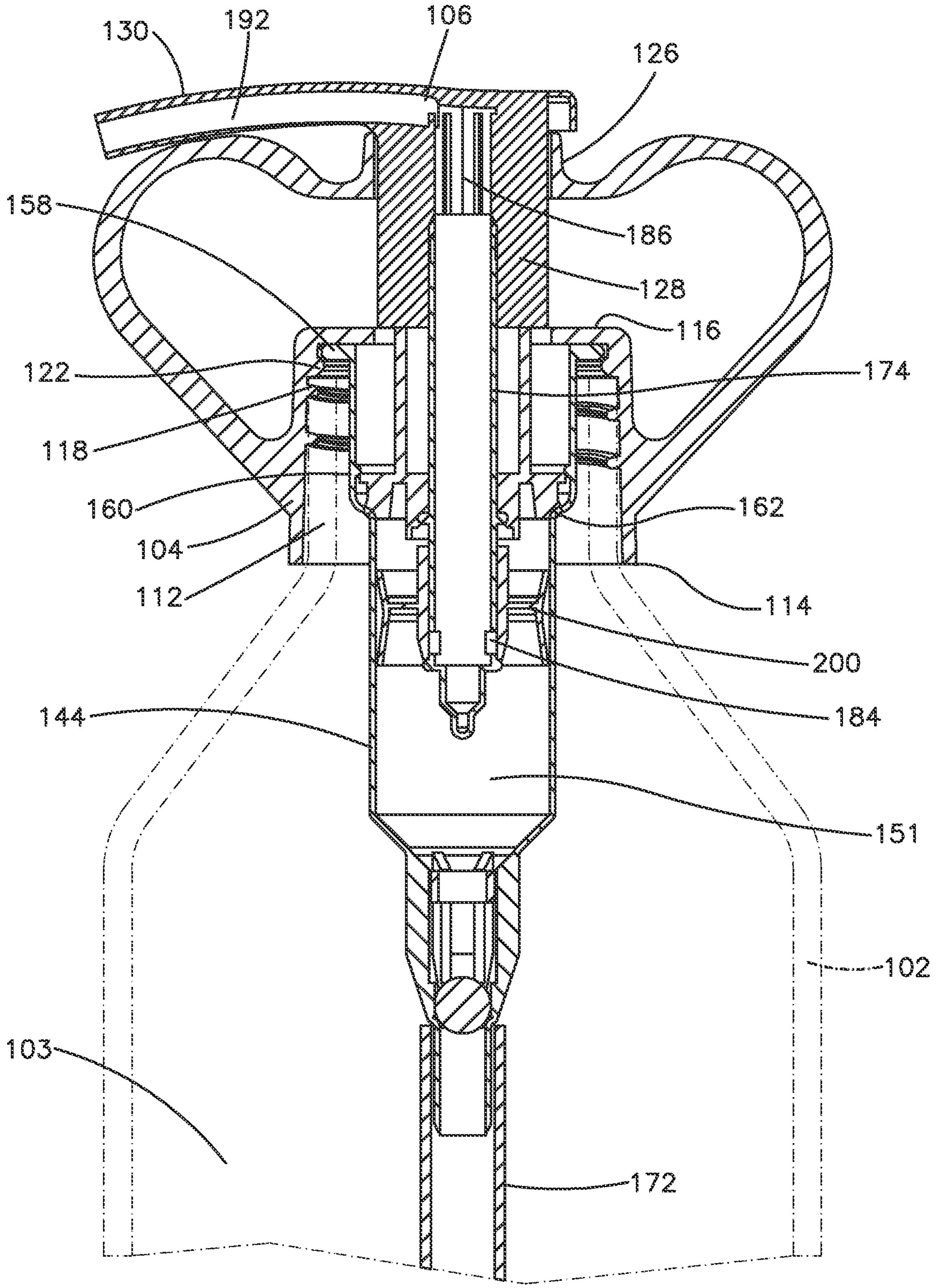
FIG. 5 is a sectional view of the container and closure in the initial configuration of FIG. 1.
Figure 6:
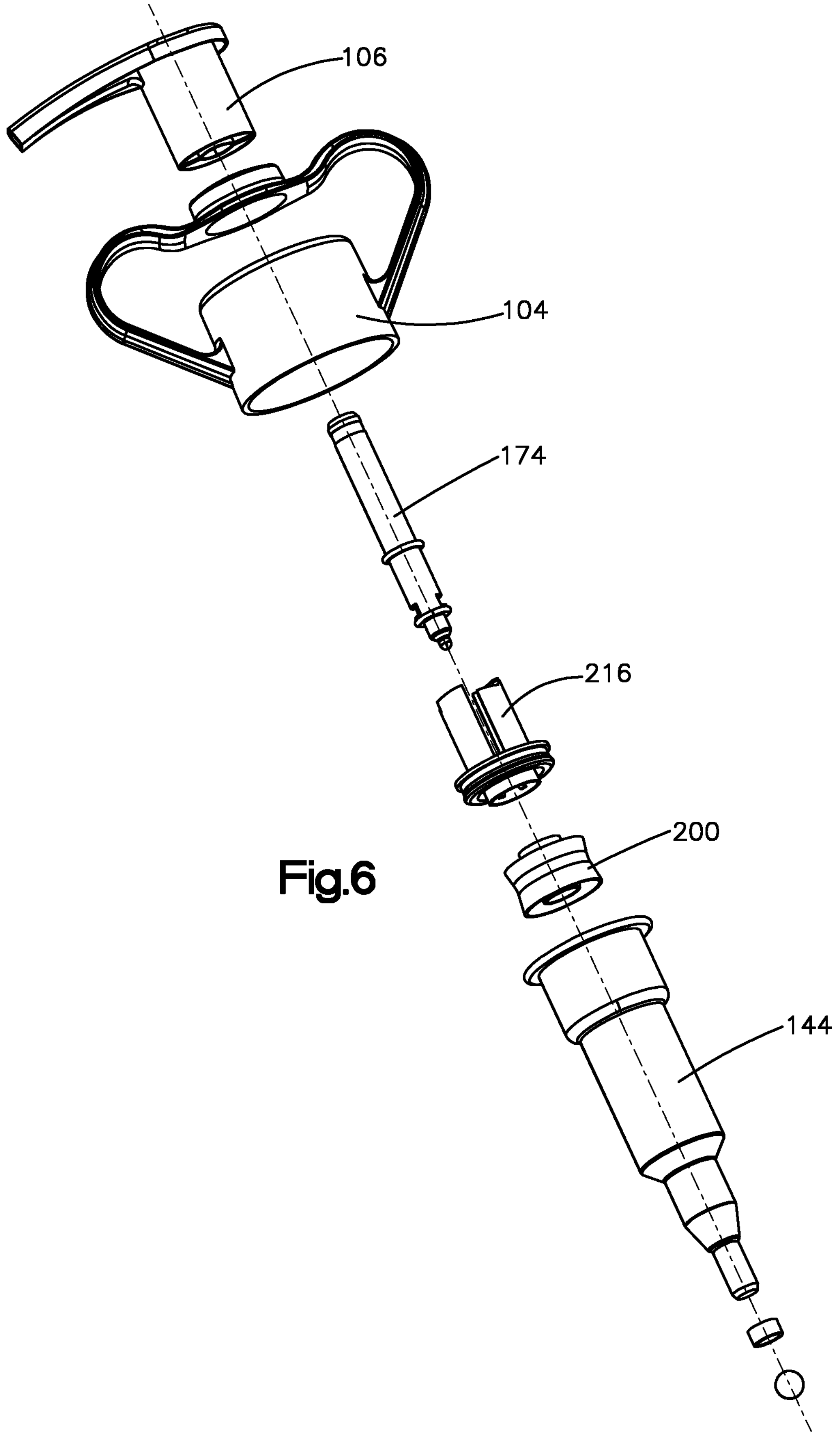
FIG. 6 is a perspective exploded view of the closure of FIG. 1.

Referring to FIGS. 4 and 5, the collar 104 can include an outer wall 110 defining a recess 112. The recess 112 can extend from a first end 114 toward a second end 116 of the collar 104. The second end 116 can be opposite the first end 114 in a longitudinal direction L. The recess 112 can extend from the first end 114 to the second end 116. The recess 112 can extend through each of the first and second ends 114, 116. The outer wall 110 can include an engagement feature 118 (FIG. 5). The engagement feature 118 can be a thread on a surface of the outer wall 110. The engagement feature 118 can be on an inner surface of the outer wall 110. The recess 112 can be configured to receive a portion of the container 102. For example, the recess 112 can be configured to receive a neck of the container. The engagement feature 118 can engage a corresponding engagement feature on the container. In other examples, the engagement feature 118 is on an outer surface of the outer wall 110. The engagement feature 118 can at least temporarily fix the collar 104 to the container 102. The engagement feature 118 may allow air to enter the container 102 as material is removed from the container 102 and dispensed out of the actuator 106. For example, the connection between the engagement feature 118 and the container 102 may not be air tight.

The collar can include an end wall 124 at the second end 116. The end wall 124 can extend inwardly from the outer wall 110. An opening 120 can extend through end wall. The opening 120 can extend through the end wall in the longitudinal direction L. The opening 120 can be configured to receive a portion of the actuator 106. The opening 120 can have a maximum dimension in a lateral direction A that is less than a maximum dimension of the recess 112 in the lateral direction A. The lateral direction A can be perpendicular to the longitudinal direction L. The actuator 106 can extend through the opening 120 such that the actuator 106 is moveable within the collar 104. The outer wall 110 can include a container facing surface and a second surface opposite the container facing surface in the lateral direction A. The container facing surface can be an interior surface of the outer wall 110. The second surface can be an exterior surface of the outer wall 110.

Referring to FIG. 5, the collar 104 can include an attaching element 122 configured to couple to a vessel 144. The attaching element 122 can be coupled to the outer wall 110. The attaching element 122 can be a protrusion that extends from the outer wall 110 into the recess 112. The attaching element 122 can be a thread that extends from the outer wall 110 to threadedly engage a flange 158 (FIG. 7) of a vessel 144. The attaching element 122 and the outer wall 110 can be a monolithic construct. The attaching element 122 can be spaced from the end wall 124 in the longitudinal direction L.

The closure 100 can be configured to apply a force to the actuator 106 to move the actuator from the second position to the first position. An applicator 126 can be configured to apply a force to the actuator 106. The applicator 126 can be configured to apply a force to a spout 130 of the actuator 106. An upper surface of the applicator 126 can engage a lower surface of the spout 130. The applicator 126 can be configured to move the actuator 106 in the longitudinal direction L. The applicator 126 can define an opening 132 configured to receive the actuator 106. The opening 132 and opening 120 can be coaxial. The applicator 126 can define a ring sized and shaped to receive a neck 128 of the actuator 106. The actuator 106 can be rotatable relative to the applicator 126 about the central axis $A_1$. The applicator 126 can be coupled to the collar 104. The applicator 126 can be movable relative to the collar 104. The applicator 126 can be spaced from the collar 104 when the actuator is in the first position. The applicator 126 can be movable in the longitudinal direction L relative to the collar 104. The applicator 126 can move toward the collar 104 as the actuator 106 moves from the first position to the second position. The applicator 126 can be spaced from the collar 104 by a first distance when the actuator is in the first position. The applicator 126 can be spaced from the collar 104 by a second distance when the actuator 106 is in the second position. The first distance can be greater than the second distance. In some examples, the applicator 126 contacts the end wall 124 of the collar 104 when the actuator is in the second position. In other examples, the applicator 126 is spaced from the end wall 124 when the actuator 106 is in the second position. The collar 104 can be positioned between the applicator 126 and the container 102. The collar 104 can be positioned between the applicator 126 and the container 102 in the longitudinal direction L. The applicator 126 can be positioned between the actuator 106 and the collar 104. The applicator 126 can be positioned between the actuator 106 and the collar 104 in the longitudinal direction L. The applicator 126 can be coupled to the collar 104 by the biasing element 108. The applicator 126 and biasing element 108 can be a monolithic construct. The applicator 126, the biasing element 108, and the collar 104 can be a monolithic construct.

The biasing element 108 can be configured to apply a force to the applicator 126. The applicator 126 can apply the force from the biasing element 108 to the actuator 106. The biasing element 108 can be coupled to the collar 104 and the applicator 126. The biasing element 108 can be coupled to the second surface of the collar 104 opposite the container facing surface. The biasing element 108 can be coupled to an exterior surface of the collar 104. The biasing element 108 can be coupled to the outer wall 110 of the collar 104. The biasing element 108 can be coupled to the outer wall 110 such that the biasing element 108 is external to the container 102. The biasing element 108 can be coupled to the outer wall 110 between the first end 114 and the second end 116. The biasing element 108 can be in an initial configuration when the actuator 106 is in the first position. The biasing element 108 can be in a compressed configuration when the actuator 106 moves from the first position toward the second position. The biasing element 108 can urge the actuator 106 toward the first position when the biasing element 108 is in the compressed configuration.

The biasing element 108 can include a first end 134 and a second end 136 opposite the first end 134 along a central axis $A_2$. The central axis $A_2$ can define a first path when the actuator is in the first position. The central axis $A_2$ can define a second path when the actuator is in the second position. The first path can be different from the second path. The first end 134 can be coupled to the collar 104 and the second end 136 can be coupled to the applicator 126. The first end 134 can be distal to a proximal end of the collar 104 and the second end 136 can be proximal to a proximal end of the collar when the actuator 106 is in the first position. The second end 136 can move toward a proximal end of the container 102 as the actuator moves from the first position to the second position. The proximal end of the container can be closer to the collar 102 than the distal end of the container. The second end 136 can be proximal to a proximal surface of the collar 104 when the actuator 106 is in the second position.

The biasing element 108 can have a width in the lateral direction A. The width can be measured from the central axis $A_1$ to a lateral most surface 138 furthest from the central axis $A_1$. The width can increase as the biasing element moves from the initial configuration to the compressed configuration. The width can be greater in the compressed configuration than in the initial configuration. The lateral surface 138 can be spaced from the central axis $A_1$ by a first distance. The lateral surface 138 can be spaced from the central axis $A_1$ by a first distance in the lateral direction A. The outer wall 110 of the collar 104 can be spaced from the central axis $A_1$ by a second distance. The outer wall 110 of the collar 104 can be spaced from the central axis $A_1$ by a second distance in the lateral direction A. The first distance can be greater than the second distance when the actuator 106 is in the first position. The first distance can be greater than the second distance when the actuator 106 is in the second position.

The biasing element 108 can include a proximal surface 140. The proximal surface 140 can be the most proximal surface of the biasing element. The proximal surface 140 of the biasing element 108 can be proximal to a proximal surface 142 of the actuator 106 when the actuator 106 is in the first position. The proximal surface can be the surface furthest from the collar 104 in the longitudinal direction L. The proximal surface 140 of the biasing element 108 can be distal to the proximal surface of the actuator 106 when the actuator is in the second position. The proximal surface 140 can be disposed between the first end 134 and the second end 136.

The closure 100 can include more than one biasing element 108. The closure 100 can include a plurality of biasing elements spaced about the central axis $A_1$. The biasing element 108 can be a first biasing element. The closure 100 can include a second biasing element 208. The first and second biasing elements 108, 208 can be spaced from each other about the central axis $A_1$ by at about 180 to about 155 degrees, about 155 degrees to about 130 degrees, about 130 degrees to about 105 degrees, about 105 degrees to about 80 degrees, about 80 degrees to about 65 degrees, about 65 degrees to about 40 degrees, or at least about 25 degrees. The first and second biasing elements 108, 208 can be disposed on opposing sides of the collar 104. The first and second biasing elements 108, 208, the collar 104, and the applicator 126 can be a monolithic construct. The second biasing element 208 can be configured to apply a force to the applicator 126. The applicator 126 can apply the force from the second biasing element 208 to the actuator 106. The second biasing element 208 can be coupled to the collar 104 and the applicator 126. The second biasing element 208 can be coupled to the second surface of the collar 104 opposite the container facing surface. The second biasing element 208 can be coupled to an exterior surface of the collar 104. The second biasing element 208 can be coupled to the outer wall 110 of the collar 104. The second biasing element 208 can be coupled to the outer wall 110 such that the second biasing element 208 is external to the container 102. The second biasing element 208 can be coupled to the outer wall 110 between the first end 114 and the second end 116. The second biasing element 208 can be in an initial configuration when the actuator 106 is in the first position. The second biasing element 208 can be in a compressed configuration when the actuator 106 moves from the first position toward the second position. The second biasing element 208 can urge the actuator 106 toward the first position when the second biasing element 208 is in the compressed configuration.

The second biasing element 208 can include a first end 234 and a second end 236 opposite the first end 234 along a central axis A3. The central axis A3 can define a first path when the actuator is in the first position. The central axis A3 can define a second path when the actuator is in the second position. The first path can be different from the second path. The first end 234 can be coupled to the collar 104 and the second end 236 can be coupled to the applicator 126. The first end 234 can be distal to a proximal end of the collar 104 and the second end 236 can be proximal to a proximal end of the collar when the actuator 106 is in the first position. The second end 236 can move toward a proximal end of the container 102 as the actuator moves from the first position to the second position. The proximal end of the container can be closer to the collar 102 than the distal end of the container. The second end 236 can be proximal to a proximal surface of the collar 104 when the actuator 106 is in the second position.

The second biasing element 208 can have a width in the lateral direction A. The width can be measured from the central axis $A_1$ to a lateral most surface 238 furthest from the central axis $A_1$. The width can increase as the biasing element moves from the initial configuration to the compressed configuration. The width can be greater in the compressed configuration than in the initial configuration. The lateral surface 238 can be spaced from the central axis $A_1$ by a first distance. The lateral surface 238 can be spaced from the central axis $A_1$ by a first distance in the lateral direction A. The outer wall 110 of the collar 104 can be spaced from the central axis $A_1$ by a second distance. The outer wall 110 of the collar 104 can be spaced from the central axis $A_1$ by a second distance in the lateral direction A. The first distance can be greater than the second distance when the actuator 106 is in the first position. The first distance can be greater than the second distance when the actuator 106 is in the second position.

The second biasing element 208 can include a proximal surface 240. The proximal surface 240 can be the most proximal surface of the biasing element. The proximal surface can be the surface that is furthest from the collar 104 in the longitudinal direction L. The proximal surface 240 of the second biasing element 208 can be proximal to a proximal surface 142 of the actuator 106 when the actuator 106 is in the first position. The proximal surface 240 of the second biasing element 208 can be distal to the proximal surface of the actuator 106 when the actuator is in the second position. The proximal surface 240 can be disposed between the first end 234 and the second end 236.

Figure 7:
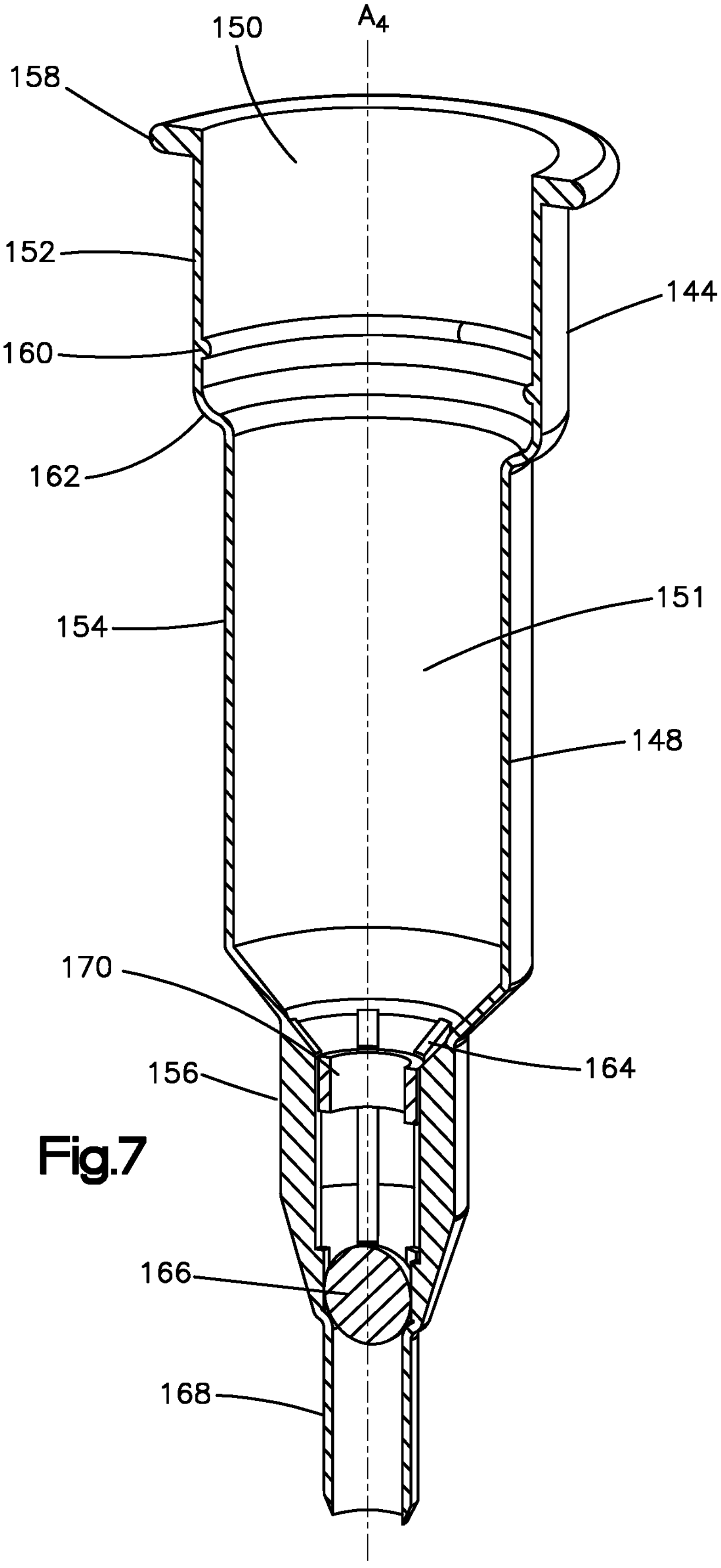
FIG. 7 is a sectional view of the vessel of FIG. 6.

Referring to FIG. 7, a vessel 144 can be configured to receive material from the cavity 103 (FIG. 5) within the container 102. The actuator 106 can be configured to dispense the material from the vessel 144. The vessel 144 can include a sidewall 148 defining a channel 150. A first portion 152 of the vessel 144 can be configured to couple to the collar 104. The channel 150 can extend through the first portion 152 in the longitudinal direction L. A securing element 160 can be coupled to the first portion 152 of the vessel 144. The securing element 160 can be configured to secure an actuator lock 216 to the vessel 144. The securing element 160 can be a protrusion that extends from an interior surface of the sidewall 148.

The first portion 152 can include a flange 158 that extends from the sidewall 148. The flange 158 can extend from the sidewall 148 in the lateral direction A away from the central axis $A_1$. The flange 158 can be configured to be positioned between the end wall 124 and the attaching element 122 of the collar 104. In some examples, the flange 158 can be snap fit into the space between the end wall 124 and the attaching element 122. In other examples, the flange 158 can be rotated to threadedly engage the attaching element 122.

The vessel 144 can include a second portion 154 that defines a fluid chamber 151 to receive material from the container 102. The second portion 154 can have a width in the lateral direction A that is less than the width of the first portion 152. The channel 150 can extend through the second portion 154 in the longitudinal direction L. The second portion of the channel 150 can have a width that is less than a first portion of the channel 150. In some examples, there is no energy source within the fluid chamber 151. In some examples, the vessel 144 does not include an energy source.

The vessel 144 can include a seat 162 for an actuator lock 216. The actuator lock seat 162 can be positioned at the interface between the first portion 152 and the second portion 154. The actuator lock seat 162 can be a shoulder. The actuator lock seat 162 can be spaced from the securing element 160 in the longitudinal direction L.

The vessel 144 can include a third portion 156 adjacent the second portion 154. The third portion 156 can have a width in the lateral direction A that is less than the width of the first portion 152. The third portion 156 can have a width in the lateral direction A that is less than the width of the second portion 154. The channel 150 can extend through the third portion 156 in the longitudinal direction L. The third portion 156 of the channel 150 can have a width that is less than a width of the first portion 152 of the channel 150. The third portion 156 of the channel 150 can have a width that is less than the second portion 154 of the channel.

The vessel 144 can be configured to receive a valve to create an air lock within the fluid chamber 151. The third portion 156 can include a guiding feature 164 for the valve. The guiding feature 164 can be one or more ribs that extend from the sidewall 148 into the channel 150. The ribs can be elongate in the longitudinal direction L. The ribs can be spaced from each other about a central axis A4 of the vessel 144 such that material from the container can flow in the space between the ribs into the fluid chamber 151. In some examples, the valve is a ball valve. In other examples, the valve is a flap valve. A ball 166 can be received within a spaced defined by the guiding feature 164. The ball 166 can engage a valve seat to create an air lock in the fluid chamber 151. The valve seat can be a portion of the sidewall 148 defining an inlet 168. The ball 166 can be moveable relative to the vessel 144. The guiding feature 164 can restrict the ball 166 to movement in the longitudinal direction L. The ball 166 can engage the valve seat when the actuator 106 is in the second position. The vessel 144 can include a restrictor 170 configured to maintain the valve within the space defined by the guiding feature 164. The restrictor 170 can be positioned within the spaced defined by the guiding feature 164. The restrictor 170 can be fixed relative to the vessel 144 in the longitudinal direction L. The restrictor 170 can be fixed to the guiding feature 164. The restrictor 170 can be a ring having a central opening with a diameter that is smaller than a diameter of the ball 166 such that the ball cannot pass through the central opening of the restrictor. The restrictor 170 can be configured to allow material from the container 102 to flow through the central opening.

The inlet 168 can be configured to allow material from the container 102 to flow into the fluid chamber 151. In some examples, the inlet 168 is disposed within the cavity 146 of the container 102 such that the material directly enters into the inlet 168. In other examples, a fluid communication device 172 (FIG. 5) is coupled to the inlet 168. Material can flow through the fluid communication device 172 and into the inlet 168. The fluid communication device 172 can be a dip tube. The fluid communication device 172 can be a straw. The fluid communication device 172 can be a pipe.

Figure 8:
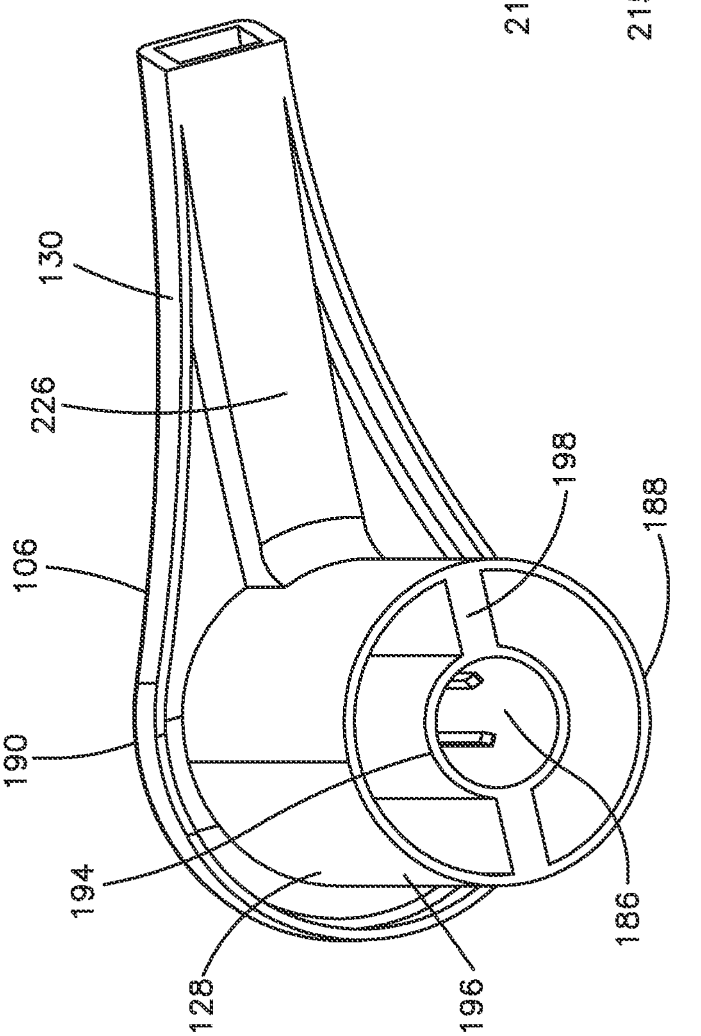
FIG. 8 is a bottom perspective view of the actuator of FIG. 1.

The actuator 106 can be configured to couple to a conduit 174 such that fluid flows through the conduit and into the actuator 106. Referring to FIG. 8, the actuator 106 can include a recess 186 configured to receive at least a portion of the conduit 174. The recess 186 can extend from a first end 188 toward a second end 190 of the actuator 106. The first end 188 can be opposite the second end 190 in the longitudinal direction L. The recess 186 can be a fluid path for material from the container 102 to flow out of the actuator 106. The spout 130 of the actuator 106 can include a channel 192 (FIG. 5) in fluid communication with the recess 186. Material from the container 102 can flow into the fluid chamber 151, through the conduit 174, and out of the actuator 106. The recess 186 can be defined by a sidewall 194. The sidewall 194 can be spaced from a neck sidewall 196 defining the neck 128 of the actuator 106. The sidewall 194 can be spaced from the neck sidewall 196 in the lateral direction A. The sidewall 194 can be coupled to the neck sidewall 196 by a strut 198.

Figure 9:
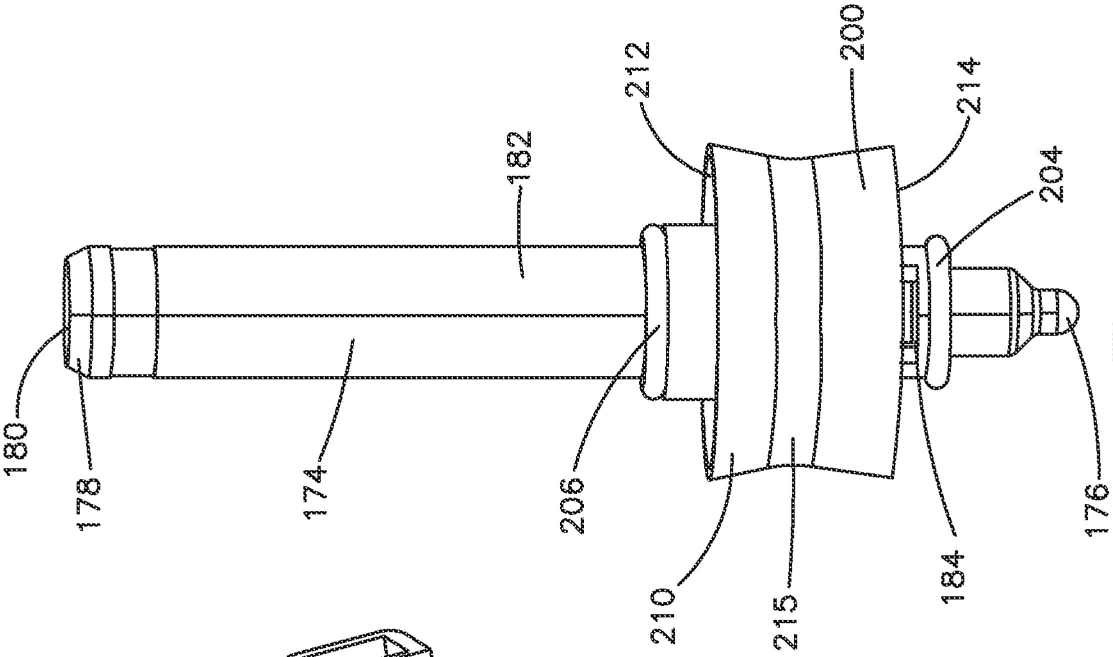
FIG. 9 is a side elevation view of the conduit and seal of FIG. 6 with the seal in an unsealed configuration.

Referring to FIG. 5, the conduit 174 can provide a fluid path between the fluid chamber 151 and the actuator 106. In some examples, the conduit 174 and the actuator 106 are a monolithic construct. In other examples, the conduit 174 is detachably coupled to the actuator 106. The conduit 174 can include a first end 176 and a second end 178 (FIG. 9). The second end 178 can be coupled to the actuator 106. In some examples, the conduit 174 is rotationally fixed relative to the actuator 106. In other examples, the conduit 174 is rotatably coupled to the actuator 106. The conduit 174 can be fixed relative to the actuator 106 in the longitudinal direction L. The conduit 174 can move relative to the collar 104 as the actuator 106 moves from the first position to the second position.

The conduit 174 can be elongate between the first end 176 and the second end 178. The conduit 174 can include a channel 180 such that material from the container can flow through the channel 180. The channel 180 can extend from the second end 178 toward the first end 176. The channel 180 can extend through the second end 178. The conduit 174 can include a sidewall 182. An inlet 184 can be in fluid communication with the channel 180. The inlet 184 can extend through the sidewall 182. In other examples, the inlet 184 can extend through the first end 176. The channel 180 can be elongate in the longitudinal direction L. The inlet 184 can extend through the sidewall 182 in a direction transverse to the longitudinal direction L. The inlet 184 can extend through the sidewall 182 in the lateral direction A.

Figure 11:
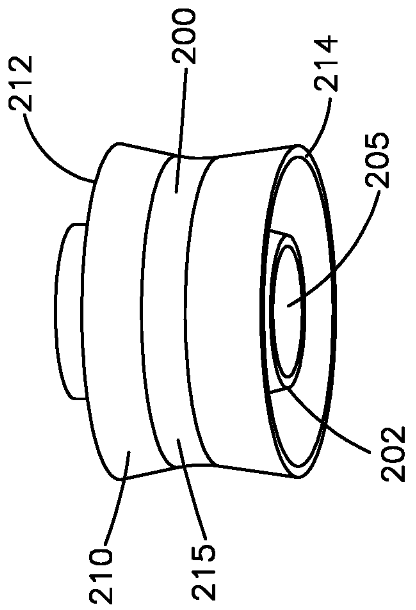
FIG. 11 is a perspective view of the seal of FIG. 9.
Figure 10:
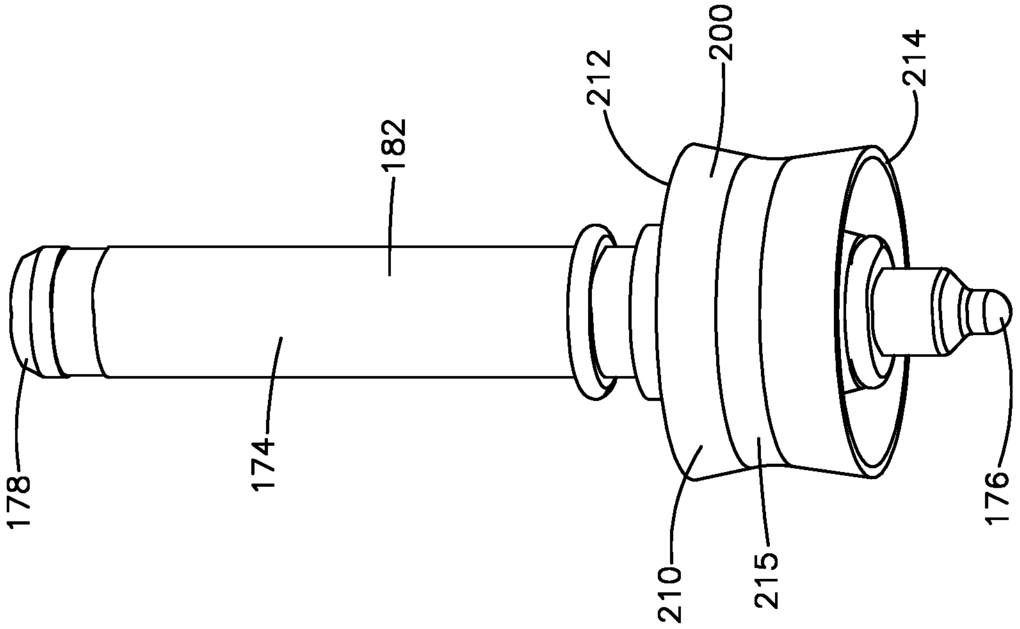
FIG. 10 is a side elevation view of the conduit and seal of FIG. 6 with the seal in a sealed configuration.

A seal 200 can be configured to prevent material from the fluid chamber 151 from entering the inlet 184 of the conduit 174. In some examples, the seal 200 is a diaphragm. The seal 200 can transition from a sealed configuration where the seal 200 occludes the inlet 184 to an unsealed configuration where the seal 200 allows material to enter the inlet 184. The seal 200 can be movably coupled to the conduit 174. The seal 200 can be movable relative to the conduit 174 in the longitudinal direction L. In other examples, the seal 200 can be movable relative to the conduit 174 in the lateral direction A. The seal 200 can include an inner wall 202 defining a recess 205 (FIG. 11). The recess 205 can be configured to receive the conduit 174. The inner wall 202 can be configured to form a fluid seal with the sidewall 182 of the conduit 174. The seal 200 can be moveable relative to the conduit 174 from a first position (FIG. 10) to a second position (FIG. 9). The seal 200 can be in the sealed configuration when the seal 200 is in the first position. The seal 200 can be in the unsealed configuration when the seal 200 is in the second position. The seal 200 can be rubber. The seal 200 can be a flexible material.

The conduit 174 can be configured to limit movement of the seal 200 relative to the conduit 174. The conduit 174 can include a first seal seat 204 configured to prevent movement of the seal 200 in the longitudinal direction L relative to the conduit 174. In some examples, the seal 200 contacts the first seal seat 204 when the seal is in the first position. In other examples, the seal 200 moves toward the first seal seat 204 as the seal 200 transitions from the second position to the first position but the seal 200 does not contact the first seal seat 204. The inner wall 202 can contact the first seal seat 204 when the seal 200 is in the first position. The first seal seat 204 can be a ridge that extends from the sidewall 182 of the conduit 174. The first seal seat 204 can be a ridge that extends from the sidewall 182 in the lateral direction A.

The conduit 174 can include a second seal seat 206 configured to prevent movement of the seal 200 in the longitudinal direction L relative to the conduit 174. In some examples, the seal 200 contacts the second seal seat 206 when the seal is in the second position. In other examples, the seal 200 moves toward the second seal seat 206 as the seal 200 transitions from the first position to the second position but the seal 200 does not contact the second seal seat 206. The inner wall 202 can contact the second seal seat 206 when the seal 200 is in the second position. The second seal seat 206 can be a ridge that extends from the sidewall 182 of the conduit 174. The second seal seat 206 can be a ridge that extends from the sidewall 182 of the conduit 174 in the lateral direction A. The seal 200 can be disposed between the first and second seal seats 204, 206.

The seal 200 can include an outer wall 210 configured to engage the sidewall 148 of the fluid chamber 151. The outer wall 210 can provide a fluid seal with the sidewall 148. The seal 200 can include a first end 212 and a second end 214. The first end 212 can be opposite the second end 214 in the longitudinal direction L. The outer wall 210 can include a central portion 215 between the first end 212 and the second end 214. The central portion 215 can have a width in the lateral direction A that is less than a width of the first end 212. The width of the central portion 215 can be less than the width of the second end 214. The first and second ends 212, 214 can have equal widths. At least one of the first and second ends 212, 214 can contact the sidewall 148 of the fluid chamber 151. At least one of the first and second ends 212, 214 can create a fluid seal with the sidewall 148. The outer wall 210 can have a length in the longitudinal direction L that is less than a length of the inner wall 202.

The seal 200 can be movable relative to the fluid chamber 151. The seal 200 can be movable relative to the fluid chamber 151 in the longitudinal direction L. The seal 200 can be movable relative to the conduit 174. The seal 200 can be movable relative to the conduit 174 in the longitudinal direction L. A first force can be required to overcome friction between the seal 200 and the sidewall 148 of the fluid chamber 151 to move the seal 200 relative to the sidewall 148. A second force can be required to overcome the friction between the seal 200 and the conduit 174 to move the seal relative to the conduit 174. The first force can be greater than the second force. The seal 200 can be in the first position when the actuator 106 is in the first position (FIG. 5).

Figure 12:
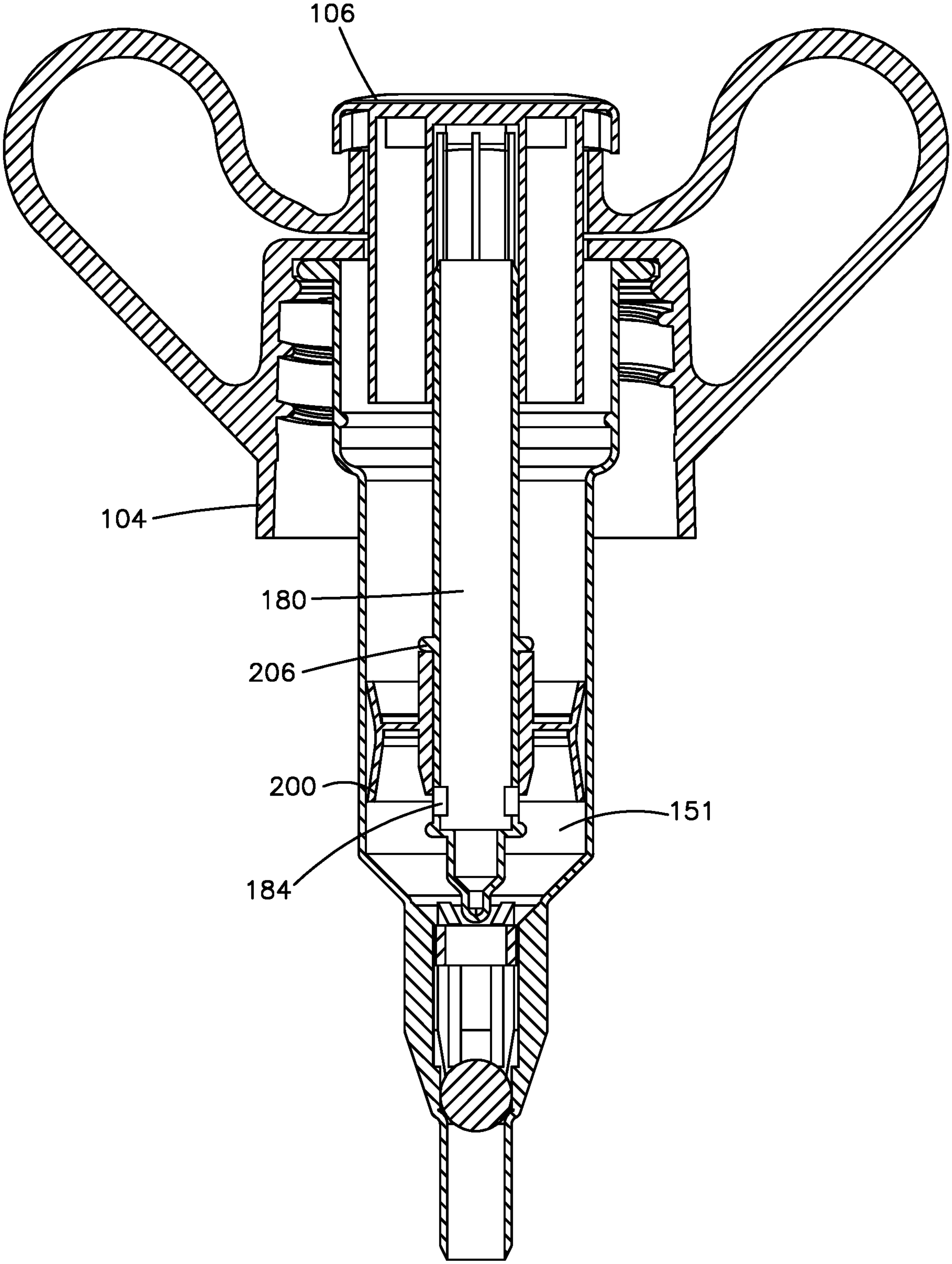
FIG. 12 is a sectional view of the container and closure of FIG. 1 in the dispensing configuration.

A user can apply a force to the actuator 106 to move the actuator from the first position to the second position. As the actuator 106 moves to the second position, the first force can be greater than the second force such that the seal 200 remains fixed relative to the sidewall 148 of the fluid chamber 151 as the conduit 174 moves relative to the sidewall 148. The conduit 174 can move relative to the seal 200 until the seal 200 is in the second position and the inner wall 202 contacts the second seal seat 206. Fluid from the fluid chamber 151 can enter the inlet 184 when the seal 200 is in the second position. With the seal 200 in the second position, the second seal seat 206 can apply a force to the seal 200 such that the seal 200 and the conduit 174 move together in the longitudinal direction L. The ball 166 can be engaged with the inlet 168 creating an air tight seal at one end of the fluid chamber 151 as the actuator 106 moves to the second position. The outer wall 210 of the seal can create an air tight seal at the other end of the fluid chamber 151. As the seal 200 moves relative to the fluid chamber 151 to a dispensing configuration (FIG. 12), the pressure within the fluid chamber 151 can increase due to the air tight seals at the two ends of the fluid chamber 151. Material within the fluid chamber 151 can flow through the inlet 184 and out of the actuator in response to the increase in pressure. The material within the fluid chamber 151 can be gas, fluid, solid, or semi-solid.

As the actuator 106 moves from the second position (FIG. 12) to the first position (FIG. 5), the first force can be greater than the second force such that the conduit 174 moves relative to the seal 200 from the second position toward the first position. The seal 200 can move to the first position as the conduit 174 moves relative to the seal 200. The seal 200 can occlude the inlet 184 when the seal 200 is in the first position. The conduit 174 can continue to move toward the first position when the seal 200 is occluding the inlet 184. This can create a vacuum within the fluid chamber 151 as the volume of the chamber between the seal 200 and the inlet 184 increases. The vacuum can cause the ball 166 to disengage from the inlet 184 thereby allowing material from the container to enter the fluid chamber 151. The engagement of the neck of the container with the collar 104 may not be air tight such that air from outside the container can enter the cavity 146 of the container to replace the material being evacuated through the closure 100.

Figure 13:
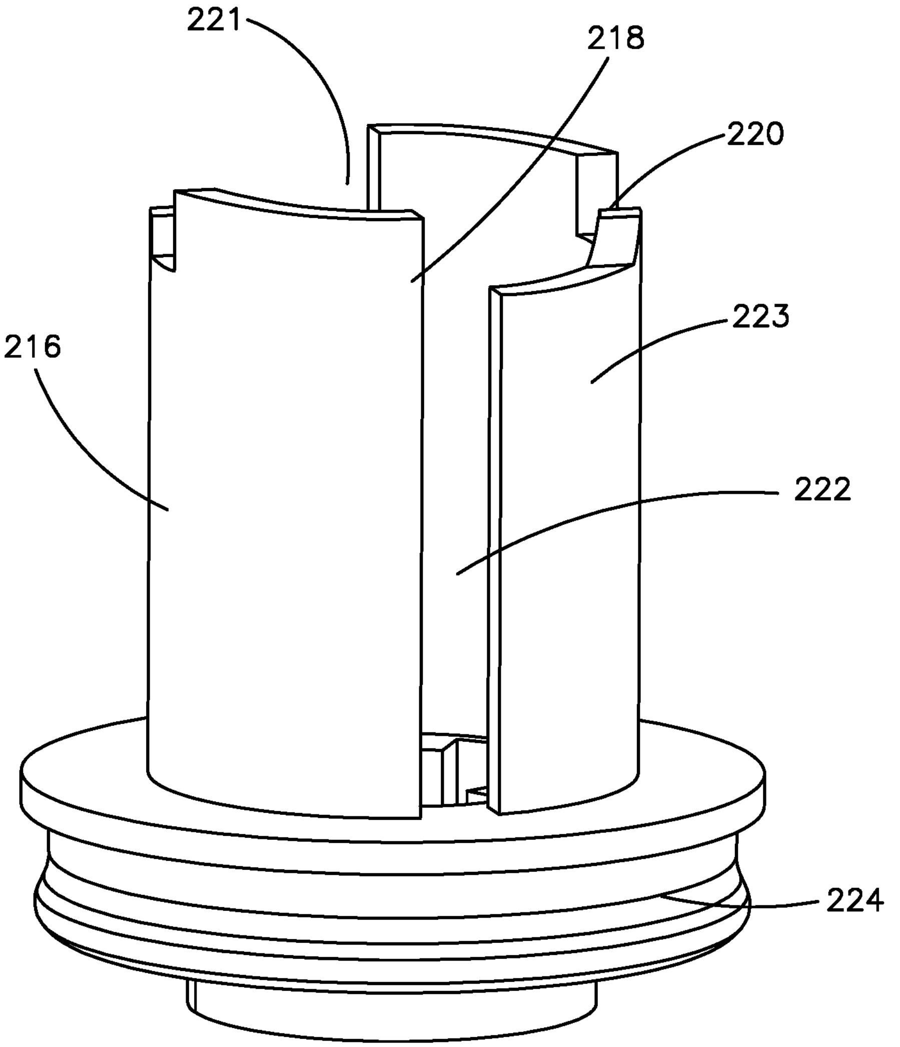
FIG. 13 is a perspective view of the actuator lock of FIG. 5.
Figure 14:
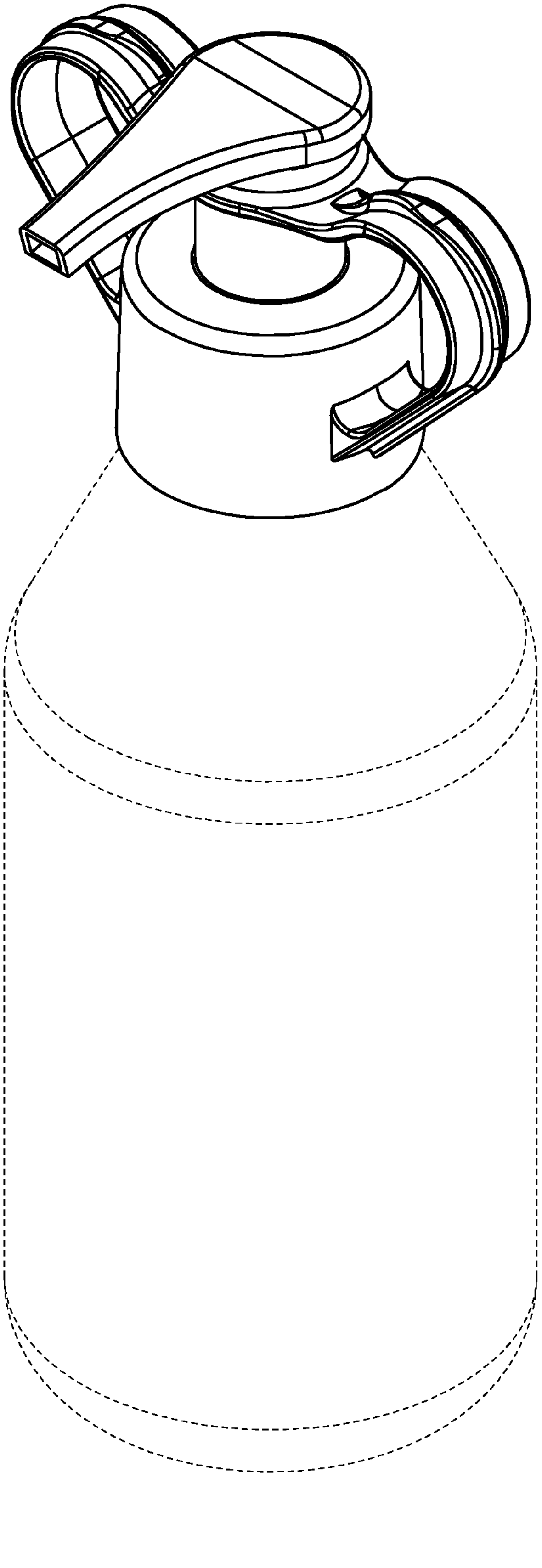
FIG. 14 is a top, front, left perspective view of a container and a closure in accordance with one embodiment of the present disclosure.
Figure 16:
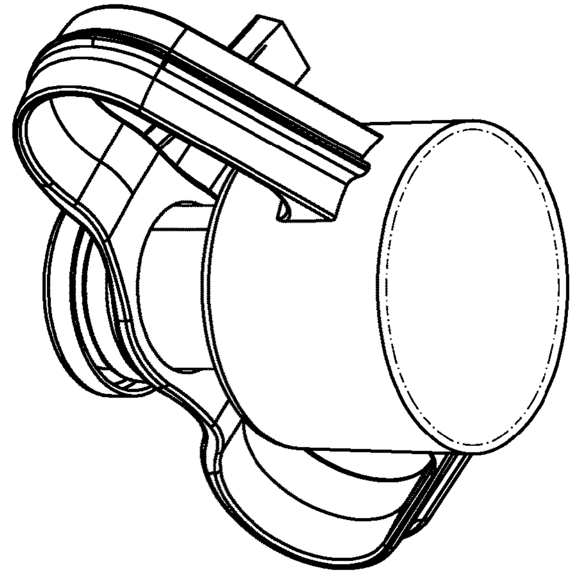
FIG. 16 is a bottom, rear, right, perspective view thereof.
Figure 17:
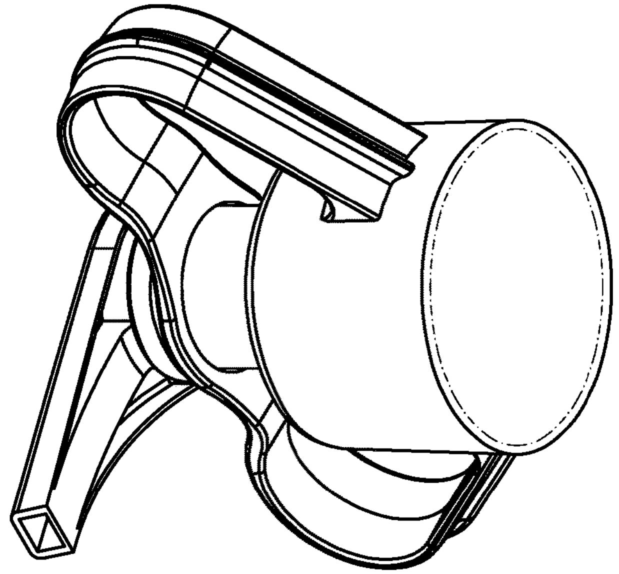
FIG. 17 is a bottom, front, left perspective view thereof.
Figure 15:
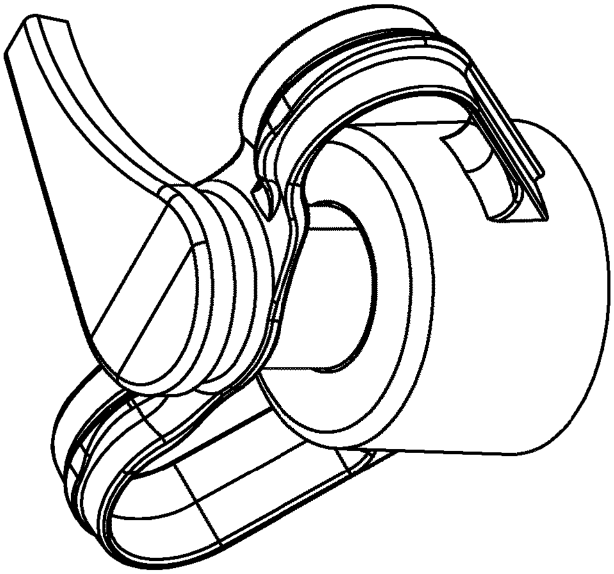
FIG. 15 is a top, rear, right, perspective view thereof.
Figure 19:
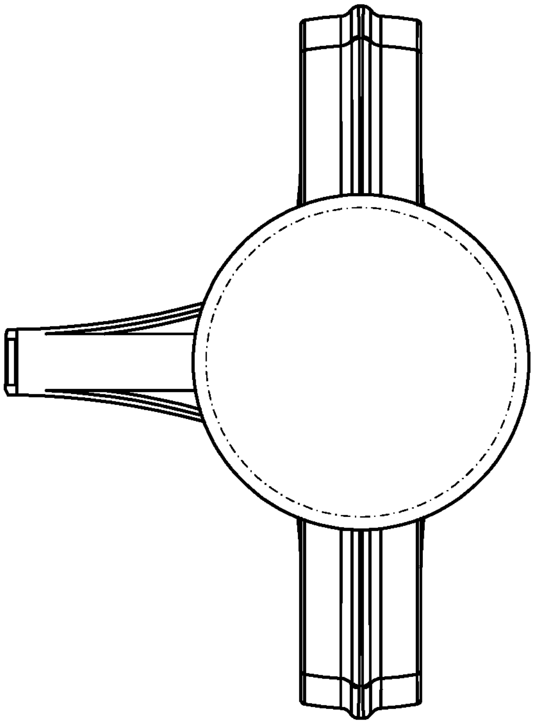
FIG. 19 is a bottom plan view thereof.
Figure 18:
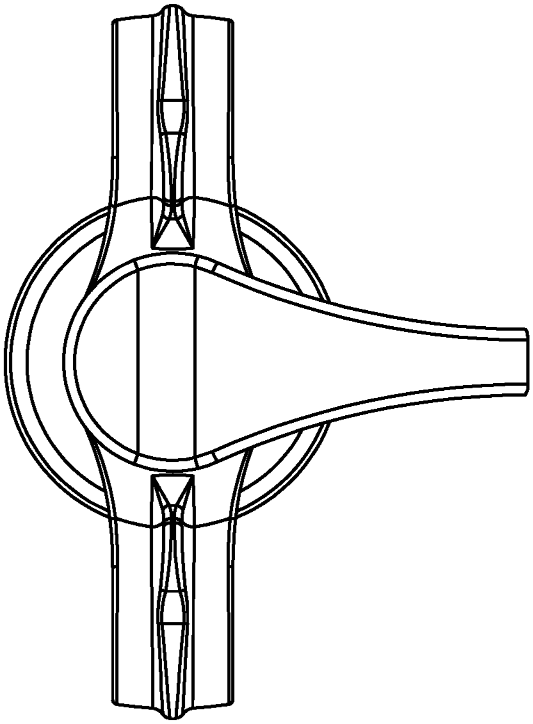
FIG. 18 is a top plan view thereof.
Figure 20:
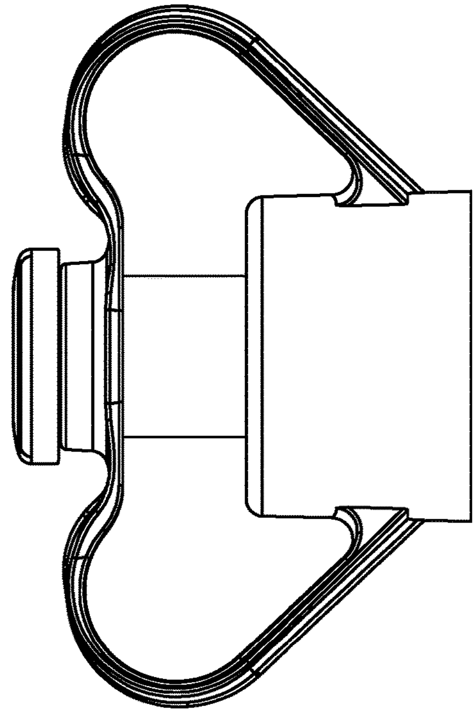
FIG. 20 is a rear elevation view thereof.
Figure 21:
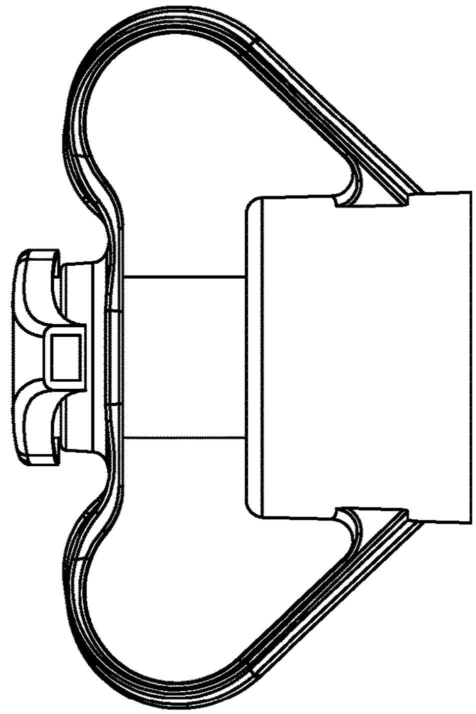
FIG. 21 is a front elevation view thereof.
Figure 22:
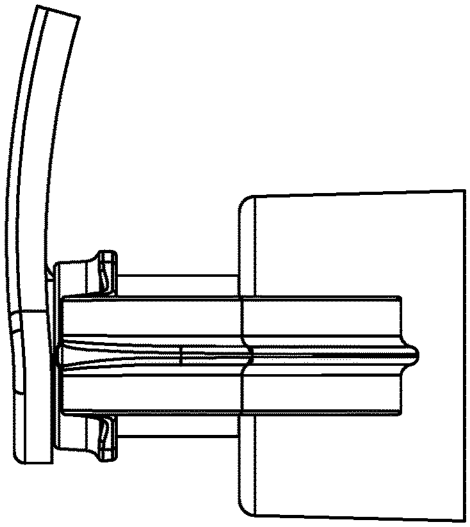
FIG. 22 is a right elevation view thereof.
Figure 23:
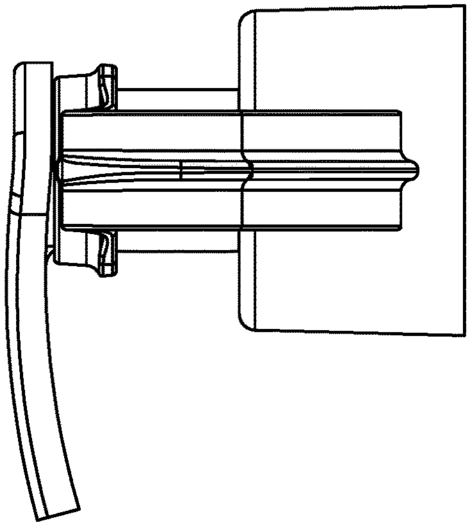
FIG. 23 is a left elevation view thereof.

Referring to FIG. 13, the closure 100 can include an actuator lock 216 configured to prevent movement of the actuator 106. The actuator lock 216 can be configured prevent movement of the actuator 106 from the first position to the second position. One of the actuator 106 and the actuator lock 216 can be movable relative to the other of the actuator 106 and the actuator lock 216 from a locked configuration to an unlocked configuration. The actuator 106 can be moveable from the first position to the second position in the unlocked configuration. The actuator lock 216 can prevent the actuator 106 moving from the first position to the second position in the locked configuration.

The actuator lock 216 can include a sidewall 218. The sidewall 218 can define an opening 221 to receive the conduit 174. The conduit 174 can be movable relative to the actuator lock 216 when the closure 100 is in the unlocked configuration. The sidewall 218 can engage the strut 198 of the actuator 106 in the locked configuration. The sidewall 218 can include an engagement feature 220 that engages the strut 198. The engagement feature 220 can be a notch. The actuator lock 216 can include a passageway 222. The passageway 222 can be disposed between a first sidewall 218 and a second sidewall 223. The strut 198 can move within the passageway 222 as the actuator 106 moves from the first position to the second position. The actuator lock 216 can include an anchor 224 configured to fix the actuator lock 216 relative to the vessel 144. The anchor 224 can engage the securing element 160 of the vessel 144. The anchor 224 can be positioned between the securing element 160 and the actuator lock seat 162 to fix the actuator lock 216 relative to the vessel 144 in the longitudinal direction L. The anchor 224 can have a width that is greater than a width of the fluid chamber 151.

The actuator 106 can be rotatable relative to the actuator lock 216 to transition between the locked and unlocked configurations. The actuator 106 can be rotatable about the central axis $A_1$ relative to the actuator lock 216. The closure 100 can be in the unlocked configuration when the strut 198 is aligned with the passageway 222 such that the strut 198 moves into the passageway 222 as the actuator 106 moves from the first position to the second position. The closure 100 can be in the locked configuration when the strut 198 is aligned with the engagement feature 220 such that the strut 198 will engage the engagement feature 220 as the actuator 106 moves from the first position to the second position.

The actuator 106 can be configured to retain the closure 100 in the locked configuration until it is unlocked by a user. Referring to FIG. 8, the actuator 106 can include a retaining element 226 configured to retain the closure 100 in the locked configuration. The retaining element 226 can be a surface of the spout 130. The retaining element 226 can be a protrusion that extends from a surface of the actuator 106. The retaining element 226 can be a protrusion that extends from the spout 130. The retaining element 226 can extend from the spout 130 in the longitudinal direction L. The retaining element 226 can extend from the spout 130 toward the collar 104. The retaining element 226 can extend from the spout 130 toward the collar 104 in the longitudinal direction L.

The retaining element 226 can be configured to engage one of the first and second biasing elements 108, 208. One of the first and second biasing elements 108, 208 can prevent movement of the actuator 106 from the first position to the second position when the closure 100 is in the locked configuration. The spout 130 of the actuator 106 can engage the proximal surface 140 of one of the first and second biasing elements 108, 208 which prevents the actuator 106 from moving to the second position.

The first biasing element 108 can include a first retainer 228 (FIG. 4). The first retainer 228 can be a ridge configured to receive the retaining element 226. The first retainer 228 can at least temporarily prevent rotation of the actuator 106 relative to the first biasing element 108. The first retainer 228 can prevent unintended rotation of the actuator 106 relative to the first biasing element 108. The first retainer 228 can extend from a surface of the biasing element 108. The engagement of the first retainer 228 and the retaining element 226 can cause one of the actuator 106 and the biasing element 108 to compress. The first retainer 228 can maintain the actuator 106 in the locked configuration via a friction engagement between the retaining element 226 and the first retainer 228.

The second biasing element 208 can include a second retainer 230 (FIG. 4). The second retainer 230 can be a ridge configured to receive the retaining element 226. The second retainer 230 can at least temporarily prevent rotation of the actuator 106 relative to the second biasing element 208. The second retainer 230 can prevent unintended rotation of the actuator 106 relative to the second biasing element 208. The second retainer 230 can extend from a surface of the second biasing element 208. The engagement of the second retainer 230 and the retaining element 226 can cause one of the actuator 106 and the second biasing element 208 to compress. The second retainer 230 can maintain the actuator 106 in the locked configuration via a friction engagement between the retaining element 226 and the second retainer 230. The actuator 106 can be rotatable from the locked configuration to the unlocked configuration and then moveable in the longitudinal direction from the first position to the second position.

While systems and methods have been described in connection with the various embodiments of the various figures, it will be appreciated by those skilled in the art that changes could be made to the embodiments without departing from the broad inventive concept thereof. It is understood, therefore, that this disclosure is not limited to the particular embodiments disclosed, and it is intended to cover modifications within the spirit and scope of the present disclosure as defined by the claims.

When values are expressed as approximations by use of the antecedent "about," it will be understood that the particular value forms another embodiment. In general, use of the term "about" indicates approximations that can vary depending on the desired properties sought to be obtained by the disclosed subject matter and is to be interpreted in the specific context in which it is used, based on its function, and the person skilled in the art will be able to interpret it as such. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, reference to values stated in ranges includes each and every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention. Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. A container closure comprising:

a collar configured to couple to a container, the collar having a first container facing surface and a second exterior surface opposite the first container facing surface;

an actuator movable relative to the collar from a first position to a second position, the actuator in fluid communication with a cavity defined by the container such that the actuator dispenses material out of the container as the actuator moves from the first position to the second position; and a biasing element consisting essentially of a first biasing element having a first portion coupled to an applicator configured to engage the actuator and a second portion coupled to the second exterior surface of the collar and a second biasing element having a first portion coupled to the applicator and a second portion coupled to the second exterior surface of the collar, the first and second biasing elements configured to bias the actuator toward the first position;

wherein the first biasing element and the second biasing element are spaced from each other about a central axis A1 by about 180 to about 155 degrees, and the collar and the biasing element are a monolithic construct.

2. The container closure of claim 1, wherein the first portion is proximal to a proximal surface of the collar and the second portion is distal to the proximal surface of the collar when the actuator is in the first position.

3. The container closure of claim 1, wherein the second portion is proximal to a distal end of the collar when the actuator is in the second position.

4. The container closure of claim 1, wherein the biasing element includes a first end and a second end opposite the first end along a biasing element central axis, the biasing element central axis defining a first path when the actuator is in the first position, the biasing element central axis defining a second path different from the first path when the actuator is in the second position.

5. The container closure of claim 1, wherein the actuator is proximal to a proximal most surface of the biasing element in the first position and wherein the actuator is distal to the proximal most surface of the biasing element in the second position.

6. The container closure of claim 1, wherein the actuator is configured to move along an actuator axis between the first position and the second position, wherein the collar includes a lateral surface spaced from the actuator axis by a first distance along a lateral axis, and wherein the biasing element includes a biasing element lateral surface spaced from the actuator axis by a second distance along the lateral axis, the second distance greater than the first distance.

7. The container closure of claim 1, wherein the actuator is moveable from a locked position to an unlocked position, wherein a retaining element of the actuator is engaged with a retainer of the biasing element in the locked position and the retaining element is disengaged from the retainer in the unlocked position.

8. The container closure of claim 1, wherein the actuator is rotatable between the locked position and the unlocked position and the actuator is axially translatable from the first position to the second position when the actuator is in the unlocked position.

9. The container closure of claim 1, further comprising a vessel coupled to the collar, the vessel configured to receive the material from the container.

10. The container closure of claim 9, further comprising a conduit having a first conduit end coupled to the actuator and a second conduit end within the vessel, the conduit defining a pathway such that material moves from the vessel through the conduit and out the actuator.

11. The container closure of claim 10, further comprising a seal forming a liquid barrier between the conduit and the vessel.

12. The container closure of claim 11, wherein the seal is movable relative to the conduit from a sealed position where the seal prevents the material from entering or exiting the conduit to a released position where the material can enter or exit the vessel through the conduit.

13. The container closure of claim 10, wherein at least a portion of the vessel is disposed inside the cavity of the container and the biasing element is disposed outside the cavity of the container.

14. The container closure of claim 9, wherein the vessel does not include an energy source.

15. The container closure of claim 1, wherein the container closure is made from a recyclable material.

* * * * *